US012619933B2

(12) United States Patent
Ludlow et al.

(10) Patent No.: US 12,619,933 B2
(45) Date of Patent: May 5, 2026

(54) INTELLIGENT WORKFLOW FOR REPAIR SKILLS AUGMENTATION

(71) Applicant: INTERNATIONAL BUSINESS MACHINES CORPORATION, Armonk, NY (US)

(72) Inventors: Mark J Ludlow, Fairfield, CT (US); Michael Jack Martine, Chapel Hill, NC (US); Lucia Larise Stavarache, Columbus, OH (US); Sarah Diane Green, Chandler, AZ (US); Stan Kevin Daley, Espanola, NM (US); Ira L. Allen, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/903,360

(22) Filed: Oct. 1, 2024

(65) Prior Publication Data

US 2026/0094095 A1 Apr. 2, 2026

(51) Int. Cl.
| | |
|---|---|
| *G06Q 10/00* | (2026.01) |
| *G06Q 10/0633* | (2023.01) |
| *G06Q 10/20* | (2023.01) |
| *G06Q 30/00* | (2023.01) |
| *G06Q 30/0601* | (2023.01) |

(52) U.S. Cl.
CPC ......... G06Q 10/0633 (2013.01); G06Q 10/20 (2013.01); G06Q 30/0633 (2013.01)

(58) Field of Classification Search
CPC ............................... G06Q 10/00; G06Q 30/00

USPC ........................................................ 705/7.27
See application file for complete search history.

(56) References Cited

U.S. PATENT DOCUMENTS

| | | | |
|---|---|---|---|
| 6,983,190 | B2 | 1/2006 | Denton |
| 7,082,418 | B2 | 7/2006 | Levy |
| 9,280,911 | B2 | 3/2016 | Sadeh-Koniecpol |
| 10,719,501 | B1 * | 7/2020 | Leise ..................... G06Q 40/00 |

(Continued)

FOREIGN PATENT DOCUMENTS

| | | |
|---|---|---|
| CN | 117522372 A | 2/2024 |
| CN | 117112769 B | 4/2024 |
| WO | 2023168517 A1 | 9/2023 |

OTHER PUBLICATIONS

TechXplore, Researchers unveil tool to help developers create augmented reality task assistants, Sep. 28, 2023, pp. 1-3.

*Primary Examiner* — Mustafa Iqbal
(74) *Attorney, Agent, or Firm* — Elliot J. Shine, Esq.; Blanche E. Schiller, Esq.; Heslin Rothenberg Farley & Mesiti P.C.

(57) ABSTRACT

A request to repair an object is received via at least one network. Based on obtaining the request via the at least one network, an intelligent workflow is executed on at least one computing device to generate instructions to be used by a user to repair the object. The intelligent workflow executes at least one artificial intelligence model trained to generate the instructions based on a skill level of the user as related to repairing the object. Based on determining that a resource to be used by the user to repair the object is inaccessible to the user and using the intelligent workflow being executed, an indication of one or more alternative resources to be used by the user to repair the object is automatically generated. A record of the repair is recorded in a blockchain.

20 Claims, 7 Drawing Sheets

(56)                    References Cited

U.S. PATENT DOCUMENTS

| | | | |
|---|---|---|---|
| 11,657,345 B2 | 5/2023 | Hatfield | |
| 11,681,970 B2 | 6/2023 | Shirazipour | |
| 11,995,582 B2 | 5/2024 | Jaggers | |
| 2005/0090921 A1 | 4/2005 | Denton | |
| 2010/0042516 A1 | 2/2010 | Knipfer | |
| 2014/0365268 A1* | 12/2014 | Masterlark | G06F 11/008 |
| | | | 705/7.28 |
| 2017/0185904 A1* | 6/2017 | Padmanabhan | G06N 5/04 |
| 2022/0130272 A1 | 4/2022 | Foroughi | |
| 2022/0155739 A1* | 5/2022 | Baazi | G05B 23/0283 |
| 2023/0111384 A1* | 4/2023 | Byers | G06Q 10/063114 |
| | | | 705/7.15 |
| 2024/0161025 A1 | 5/2024 | Dechu | |
| 2024/0403833 A1* | 12/2024 | Patz | G06Q 10/20 |
| 2025/0139590 A1* | 5/2025 | Swartz | G06Q 10/20 |

* cited by examiner

100

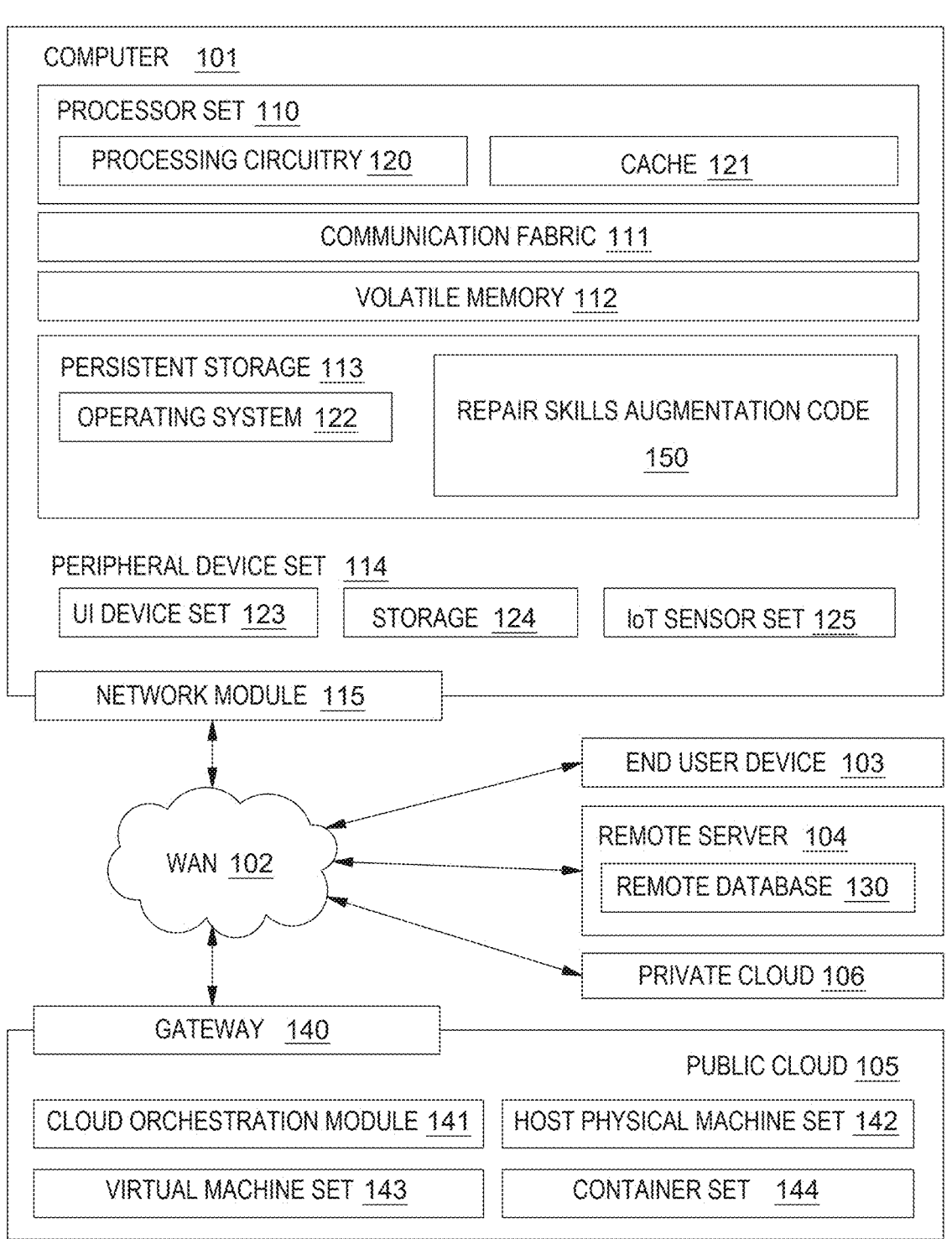

COMPUTER   101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122      REPAIR SKILLS AUGMENTATION CODE 150

PERIPHERAL DEVICE SET   114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET   144

RANK SIMULATED PREDICTED REPAIR PROCESSES ~610

SELECT OPTIMAL SIMULATED PREDICTED REPAIR PROCESS ~620

IMPLEMENT AND MONITOR ~630

DEVELOP REPAIR PROCESS ~632

IMPLEMENT REPAIR PROCESS ~634

MONITOR, ADAPT, AND FEEDBACK ~636

IMPROVE DIAGNOSIS AND PROCESSES ~650

IDENTIFY PROBLEM AREAS AND IMPROVEMENT OPPORTUNITIES ~660

INTELLIGENT WORKFLOW FOR REPAIR SKILLS AUGMENTATION

BACKGROUND

One or more aspects relate, in general, to dynamic processing within a computing environment, and in particular, to improving such processing using intelligent workflows.

Technological advances in the manufacturing of objects, including computers, electronics, automobiles, appliances, and many other objects having electronic and/or non-electronic components, have increased the need for skilled repairs. This has placed a strain on skilled workers and companies that provide skilled repairs.

SUMMARY

Shortcomings of the prior art are overcome, and additional advantages are provided through the provision of a computer-implemented method. The computer-implemented method includes receiving, via at least one network, a request to repair an object. Based on obtaining the request via the at least one network, an intelligent workflow is executed on at least one computing device to generate instructions to be used by a user to repair the object. The intelligent workflow executes at least one artificial intelligence model trained to generate the instructions based on a skill level of the user as related to repairing the object. Based on determining that a resource to be used by the user to repair the object is inaccessible to the user and using the intelligent workflow being executed, an indication of one or more alternative resources to be used by the user to repair the object is automatically generated. A record of the repair is recorded in a blockchain.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to perform, include and/or use one or more aspects of the present disclosure;

DETAILED DESCRIPTION

Figure 2:
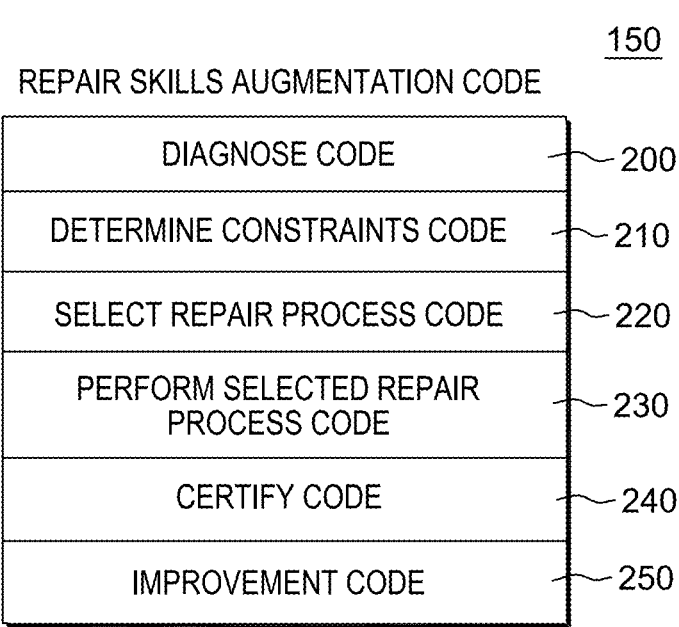
FIG. 2 depicts one example of the repair skills augmentation code of FIG. 1, in accordance with one or more aspects of the present disclosure.

In one or more aspects, a capability is provided to generate and execute an intelligent workflow. An intelligent workflow is the orchestration of automation, artificial intelligence, analytics, and skills to fundamentally change how work is performed. In one or more aspects, an intelligent workflow is defined and used to augment the skills of a user to perform a repair, such as a repair of an object. The intelligent workflow executes one or more artificial intelligence models, and therefore, may be referred to herein as an artificial intelligence workflow. As applied to repair skills augmentation, in one or more aspects, the intelligent workflow diagnoses issues, determines constraints, generates predicted repair processes, selects a repair process, executes the repair process, certifies the repair, and improves the intelligent workflow.

The intelligent workflow is generated and executed by one or more computing devices. Execution of the intelligent workflow includes executing one or more artificial intelligence models trained based on the skills of a user as related to repairing a particular object. Execution of the intelligent workflow provides the user with instructions to repair the object, which may be revised, in real-time, based on one or more of available resources, skills of the user, user requests, constraints, etc.

As used herein, an object is anything that is to be repaired. The object may include electronic and/or non-electronic components. Example objects include, but are not limited to, computers, electronics, automobiles, appliances, and other objects having electronic and/or non-electronic components. A user is, for example, a person, robot, bot and/or any entity to perform a repair. The user may request the repair and/or perform the repair based on a requester of the repair. Many examples and/or variations are possible.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of generating and/or executing an intelligent workflow (or multiple workflows or processes) that, e.g., augments repair skills of a user and/or performs one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as repair skills augmentation code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (Saas) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

In one or more aspects, users (e.g., users not skilled in specific repair actions to be undertaken by the users) are augmented with skills (e.g., skills they lack), to be able to perform a repair of a particular object. The object can be mechanical, electronic, or any other object to be repaired. Examples of objects to be repaired include, but are not limited to, computers, appliances, electronics, automobiles, manufactured objects, objects with electronic components, objects with non-electronic components, etc.

In one or more embodiments, to augment the skills of a user, an intelligent workflow is generated and executed to provide to the user a proposed resolution for repairing an object that is validated against a corpus that leverages recursive feedback. The intelligent workflow enables the user to be transformed into a repair agent. The intelligent workflow uses an artificial intelligence chain of reasoning to interactively diagnose the problem against available skills and resources (e.g., tools, parts, components, etc.) to identify repair processes; uses generative artificial intelligence to dynamically generate (e.g., on the fly, real-time) training/repair processes based on the experience (e.g., skills) of the user; verifies and certifies adherence to repair actions of the repair processes, throughout execution of the repair processes via an artificial intelligence chain of actions; writes to a blockchain for an immutable record; and captures learnings and feedback to speed the cycles of learning.

A chain of reasoning refers to a logical progression of statements or arguments designed to reach a conclusion. Each step in the reasoning process is connected logically, with premises leading to a conclusion based on deductive or inductive reasoning. Characteristics of the chain of reasoning include, for example: a logical structure that follows a structured approach in which each step is logically connected to the next, often used in problem-solving, mathematical proofs, and scientific research; objective, which is often evaluated based on the validity and soundness of the arguments, independent of the thinker's personal feelings or experiences; a directed outcome, which is a process towards reaching a specific conclusion, solving a problem or proving a hypothesis; and analytical thinking, which involves critical thinking and analytical skills to evaluate arguments, identify logical fallacies and construct coherent arguments.

A chain of reasoning is more structured and follows a logical progression aimed at concluding. A chain of reasoning focuses on objectivity and logical connections between premises and conclusions. A chain of reasoning is typically used in contexts that employ logical analysis and decision-making, such as scientific research, legal arguments and philosophical debates.

Self-repair, provided to the users via the intelligent workflow, in accordance with one or more aspects, enables the users to avoid the expense of in-person experts travelling to the location to perform a repair (as used herein repair refers to a repair and/or a service) or the expense of the users travelling to a location to receive a repair. Further, the intelligent workflow addresses the difficulty of keeping pace with the rapid changes in technology, allowing the users to learn the most up-to-date information to perform a repair. Moreover, in one or more aspects, the repairs are verified and certified. In one example, warranty certification is performed indicating that the repair has been performed properly, such that warranties are not voided. Warranty claims may also be decreased, providing a savings to manufacturers and increasing user satisfaction.

To augment repair skills of a user to enable the user to perform a repair, repair skills augmentation code (e.g., repair skills augmentation code 150) is used, in accordance with one or more aspects of the present disclosure. Repair skills augmentation code (e.g., repair skills augmentation code 150) includes code or instructions used to perform repair skills augmentation processing (e.g., of an intelligent workflow), in accordance with one or more aspects of the present disclosure. The code is, e.g., computer-readable program code (e.g., instructions) in computer-readable media, e.g., storage (storage 124, persistent storage 113, cache 121, other storage, as examples). The computer-readable media may be part of a computer program product and the computer-readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute the code and/or portions thereof. Many examples are possible.

One example of repair skills augmentation code 150 is described with reference to FIG. 2. In one example, repair skills augmentation code 150 includes diagnose code 200 to be used to diagnose one or more issues (e.g., problems, concerns, failures, something to be addressed, etc.); determine constraints code 210 to be used to determine one or more constraints related to the diagnosed issue(s); select repair process code 220 to be used to select a repair process from one or more predicted repair processes generated for a diagnosed issue; perform selected repair process code 230 to be used to perform the selected repair process; certify code 240 to be used to certify that the repair was performed correctly; and improvement code 250 to be used to improve the intelligent workflow that performs repair skills augmentation processing. Additional, less and/or other code may be provided and/or used in one or more aspects of the present disclosure.

Figure 3:
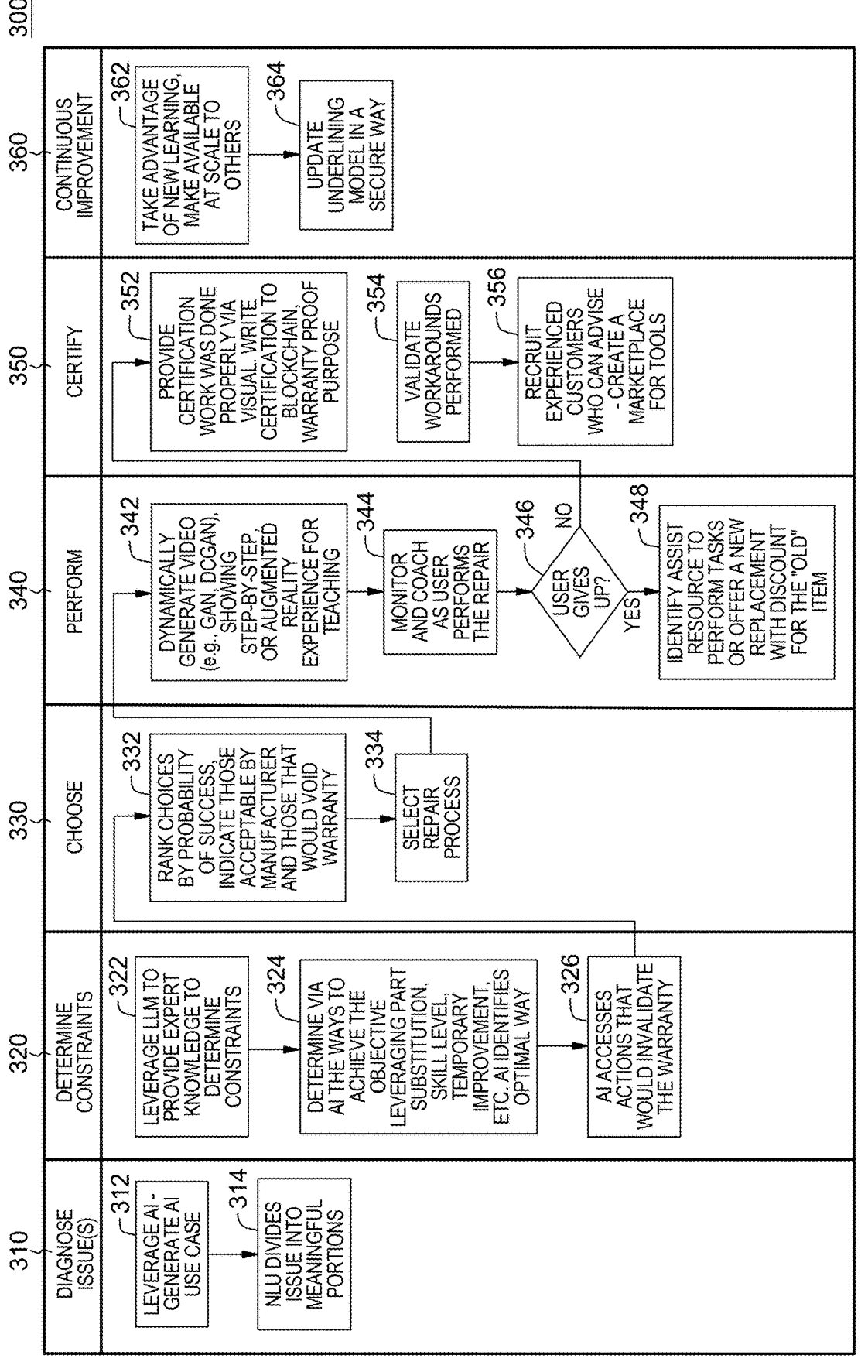
FIG. 3 depicts one example of an intelligent workflow to be used to augment repair skills of a user, in accordance with one or more aspects of the present disclosure.

In one example, repair skills augmentation code 150 includes code (e.g., code 200-250) that is used in repair skills augmentation processing, as further described in one example with reference to FIG. 3. FIG. 3 depicts one example of an intelligent workflow 300 that is executed by one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute the workflow and/or portions thereof. Various options are possible.

Referring to FIG. 3, in one example, intelligent workflow 300 (also referred to as workflow 300 or artificial intelligence workflow) diagnoses 310 one or more issues (e.g., problems, concerns, failures, something to be addressed, etc.) using, e.g., diagnose code 200. In one example, workflow 300 leverages 312 artificial intelligence, such as generative artificial intelligence use cases, based on inputs for this stage, to diagnose one or more issues. Systems, products and processes are complicated and often employ the knowledge of specialists to effect a desired change or repair. Providing the user with just enough and just-in-time (JIT) understanding allows for faster diagnosis and update.

In one example, workflow 300, based on diagnosing an issue, uses 314 natural language understanding (NLU) to divide the issue into meaningful portions. Issues are oftentimes complex and involved, and in one or more aspects, an issue is divided into meaningful portions, such that each portion may be addressed separately, if desired. That is, the workflow may be executed for each portion or one or more combined portions.

As part of diagnosing the issues, in one or more aspects, workflow 300 determines the type of repair to be performed. A repair may be, e.g., a fix, correction, upgrade, enhancement, improvement, provision of a service, etc. The type of repair may relate to the object, such as an electronic repair, a non-electronic repair, an extensive repair, minor repair, etc.

Further, based on diagnosing an issue, workflow 300 identifies resources that may be used to address the issue (e.g., repair an object). Example resources include, but are not limited to, parts (e.g., replacement parts, parts to be used to repair an object, etc.), tools, components, etc. Tools may include manual tools, automatic tools, anything used for a repair, such as, but not limited to, adhesives (e.g., glue, tape, cement, paste, etc.); fasteners (e.g., nails, screws, wire, bolts, etc.); materials (e.g., cloth, plastics, fabrics, etc.); devices (e.g., electronic devices, other devices, etc.); etc. To determine the type of repair and/or resources to be used, one or more cameras, microphone(s), accelerometer(s), geolocation, gyroscope(s) and/or other inputs may be used. To facilitate performing the repairs for a diagnosed issue, in one example, a shopping list or automated order is dynamically created for desired resources (e.g., tools, parts, components, etc.) to be used. From the list or automated order, one or more of the resources may be ordered and/or delivered. Many examples are possible.

In one example, workflow 300 uses, e.g., one or more cameras and/or other inputs to ingest the available resources (e.g., tools, parts, components, etc.) that could be used for the repair. For instance, the one or more cameras are used to scan in and save (e.g., to memory) the resources available to a user for a specific repair. Based thereon, in one example, an order may be automatically generated and placed for one or more missing resources, which may also be delivered (or picked up in a store, etc.).

In one example, as part of or based on diagnosing an issue, warranty reimbursement is dynamically applied for with one or more appropriate entities (e.g., manufacturer, vendor, store, insurance company, etc.). For instance, workflow 300 initiates a warranty reimbursement claim by sending a warranty reimbursement request to the one or more appropriate entities.

Workflow 300 determines 320, in one example, one or more constraints associated with repairing a diagnosed issue (e.g., using determine constraints code 210). There may be constraints in time, available resources (e.g., tools, parts, components, etc.), skills, etc. In one example, process 300 leverages 322 artificial intelligence (e.g., a large language model (LLM)) to provide expert knowledge to determine constraints. The large language model is an artificial intelligence program trained on a vast amount of data and built on machine learning (e.g., deep learning) that recognizes and generates text, etc. As examples, it uses the information from the one or more cameras or other inputs, product documentation of the object, past repair history, skill level of the user, and available inventory to recognize constraints and optimize based on those constraints. For instance, the large language model may determine that based on the skill level of the user and available resources that a certain tool would be easier to use than another tool. Many examples are possible.

Workflow 300 uses artificial intelligence to determine an optimal path to achieve the objective (e.g., repair the object).

As an example, the large language model recognizes substitutions for a recommended/ideal resource to complete a repair. As examples, a screwdriver and a hammer may be viable alternatives to a chisel, which may not be readily available; or a pen may be used with a fuel pump of a car. Many examples are possible.

In one or more aspects, the large language model consumes data from, e.g., multiple videos and/or other inputs, taking the best from each to create a new instruction set. Workflow 300 determines 324, via artificial intelligence (e.g., the large language model, other artificial intelligence), one or more ways to achieve the objective by leveraging part substitutions, skill level, temporary improvement, etc. Workflow 300 identifies, using the artificial intelligence, an optimal way to perform the repair.

In one or more examples, workflow 300, utilizing the large language model and/or other artificial intelligence, provides instructions of where to obtain the resources to be used or to be provided.

Further, in one or more aspects, as part of determining constraints, workflow 300 assesses 326, using artificial intelligence, actions of the repair skills augmentation processing being executed by the workflow that may invalidate one or more warranties.

In one or more aspects, service calls are mediated to improve the profitability of loyalty, resale, etc. Users are offered options of fixing the problem or performing diagnostics, as examples.

In one or more aspects, based on the diagnosed issues and the determined constraints, workflow 300 uses artificial intelligence to generate one or more repair processes that may be used to repair an object based on the constraints, including the user's skill level. The artificial intelligence predicts the repair processes that may be used, and therefore, they are referred to herein, for convenience, as predicted repair processes. The prediction is based on different circumstances (e.g., object, repair to be performed, skill level of user, different combinations of resources, different time constraints, etc.).

Workflow 300 chooses 330 from the one or more predicted repair processes that are generated a repair process (e.g., using select repair process code 220) to be used to provide the repair. In one example, workflow 300 ranks 332 the choices of repair processes (e.g., the predicted repair processes) by, e.g., probability of success, and indicates those acceptable by, e.g., the manufacturer and, in one example, those that would void the warranty. In one example, the ranking is based on, e.g., probability of success, acceptability to manufacturer, and warranty validity. Other examples are possible. From the ranked set of choices, workflow 300 selects 334 a repair process. In one example, workflow 300 provides the user with the choices and enables the user to select (e.g., automatically or manually) from the choices or to at least provide input into which choice is preferable to the user. Many examples are possible.

Based on choosing a repair process, workflow 300 performs 340 the selected repair process using, e.g., perform selected repair process code 230. For example, workflow 300 performs tasks, actions, steps, etc. to enable the user to perform the repair, as specified in the repair process. For instance, workflow 300 guides the user based on the user's skill set (e.g., skill level, experience, etc.) and available resources (e.g., tools, parts, components, etc.). As an example, workflow 300 dynamically generates 342 a video (e.g., using GAN (generative adversarial networks), DCGAN (deep convolutional generative adversarial networks)), based on the user's skill set and available resources, showing a step-by-step process to perform the repair based on, e.g., constraints and/or insight from the large language model (or other artificial intelligence).

In another embodiment, workflow 300 dynamically generates 342, based on the user's skill set and available resources, an augmented reality experience that teaches the user how to take advantage of the available resources and how to use them properly to perform the repair. Other examples are possible.

In one example, depending on the timeliness factor for the repair, optimal solutions to the issue (that are part of the selected repair process) are prioritized.

In one example, one or more resources (e.g., parts, tools, components, etc.) to be used for the repair are generated using 3D printing. Instructions are provided to create the one or more resources. Materials and a generator are provided for the 3D printer; in another example, the 3D printer is hand cranked. Specifications are transmitted to print the part in 3D. Many examples are possible.

In one example, as the user performs the repair (e.g., performs each step of the repair), workflow 300 monitors and coaches 344 the user. For instance, the workflow may show, e.g., via a video or camera, etc. where a part is to be placed, where a fastener is to be inserted, how to use a tool, etc. Many examples are possible.

Based on the monitoring, process 300 determines 346 whether the user has chosen not to proceed with the self-repair. If the user does not want to proceed, workflow 300 identifies 348 (or triggers a new workflow to identify) one or more assist resources (e.g., community member, authorized repair service, another user, etc.) to be used to perform the repair. The assist resource may provide further guidance and/or take over the repair relieving the user of its responsibility for the repair.

In a further example, if the user does not want to proceed, workflow 300 offers a new replacement for the object with, e.g., a discount for the object to be repaired. Thus, in one example, workflow 300 identifies 348 (e.g., automatically) one or more assist resources to perform the repair (e.g., one or more steps of the repair) and/or offers a new replacement. The new replacement may come with a discount for the old object. Other examples are possible.

Returning to determination 346, if the user wants to proceed, in one example, the user continues performing the repair until complete. In one example, this processing may be a loop, in which at any time during the repair process, the user may continue with repair or decide not to continue.

In one example, based on the user completing the repair, certification is performed. Certification indicates that the repair was performed properly based on, e.g., visual inspection of the repair. The certification is written, in one example, to a blockchain to ensure that there is proof of the proper repair for future warranty purposes. Certification is described in further detail herein.

In one example, workflow 300 certifies 350 (e.g., using certify code 240) that the work was performed properly (e.g., confirm and certify that the work is performed to code). For instance, in order to not void a warranty, workflow 300 initiates and/or videos, takes images, writes text, etc. to document that the correct steps were taken to perform the repair correctly. In one example, workflow 300 records 352 the documentation in, for instance, a blockchain. This is used, for instance, for warranty proof purposes.

In one example, workflow 300 validates 354 any workarounds that were performed. Workflow 300 recruits 356, for instance, experienced entities (e.g., customers, other users, experts, etc.) who can advise and/or use artificial intelligence to validate a workaround. In one example, a marketplace and/or bazaar is created for resources (e.g., a buy nothing group; tool @ public library, etc.). As a further example, blogs are used as a mechanism to validate workarounds; e.g., link; when something is validated through a blog—e.g., trusted blogs and sources of workarounds are a good way to validate workarounds that a company (e.g., original equipment manufacturer) is willing to certify. Many examples are possible.

In one example, consideration is given as to how an insurance company certifies workarounds versus how a manufacturer certifies their own product. Many examples are possible In one or more aspects, workflow 300 performs 360 continuous improvement of the intelligent workflow and/or the repair processes executed (e.g., using improvement code 250). As examples, a video generated of the repair is incorporated into the large language model or structured data set. After action surveys and videos allow for improvement about the best way to solve the issue, set in an automated manner. A recommended workaround emergency kit is provided for situations where a solution is temporary or has a high probability of failure. This facilitates the diagnosis, constraint analysis and do-loops of the intelligent workflow. A manufacturer can optimize a repair kit and send that out to the user upon request. In one example, a kit may be provided (e.g., a drone drop) to provide resources (e.g., tools, parts, components, etc.), a work around, etc. Mechanisms to provide resources, such as 3D printing instructions, assist resources, etc., are provided. Many examples are provided.

In one example, workflow 360 employs 362 information that is learned and makes it available at scale to others. In one example, workflow 300 updates 364 the underlying model, e.g., in a secure manner. Proprietary capabilities are not exposed to the large language model.

As described, process 300 is an all-in-one integrated workflow that provides the capabilities of one or more aspects of the present disclosure. The all-in-one integrated workflow prioritizes the tasks in an integrated manner. It ensures composition and re-composition. The workflow provides a comprehensive, reliable process for performing the repair. The workflow assembles, e.g., all that is to be used and/or considered, including cost/prioritization, viable processes for solution, optimal process for solution, non-traditional assemblies, etc.

Figure 4:
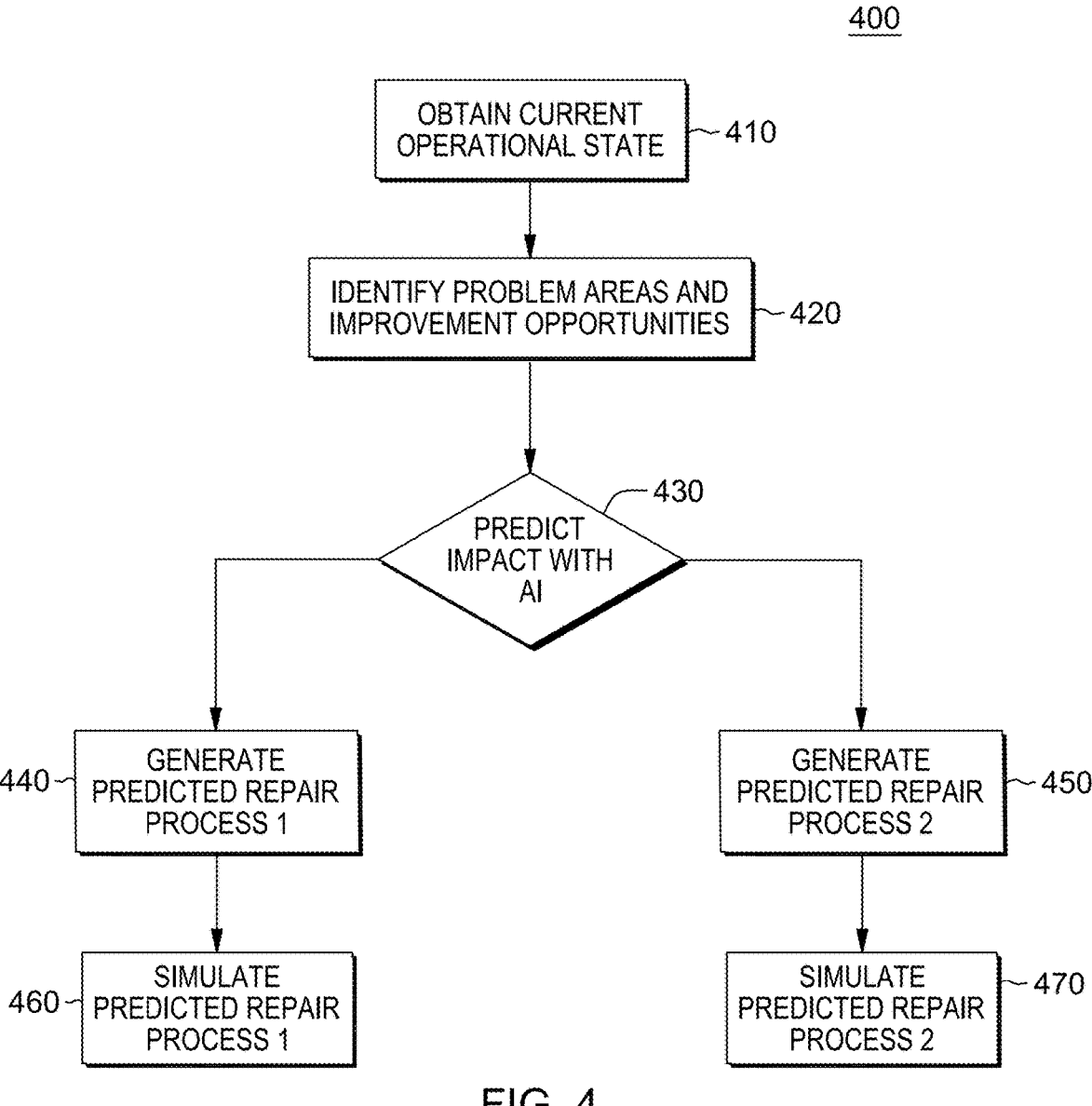
FIG. 4 depicts one example of a process to identify issues and generate predicted repair processes based on the identified issues, in accordance with one or more aspects of the present disclosure.

Further details regarding issue diagnosis and repair process generation are described with reference to FIG. 4. FIG. 4 depicts one example of a process 400 to perform issue identification and process generation. Process 400 is, in one example, part of and/or used by the intelligent workflow (e.g., workflow 300) to perform repair skills augmentation processing. Process 400 may be a workflow itself or processing executed by a workflow (e.g., workflow 300). In one example, process 400 is executed by one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute the process and/or portions thereof. Various options are possible.

Referring to FIG. 4, in one example, process 400 obtains 410 the current operational state. For instance, it obtains, as input, sensor data (e.g., of the object to be repaired, the environment, user (if explicitly authorized by the user), etc., performance logs, system health reports, available resources (e.g., tools, parts, components, etc.) and skills and/or historical repair data, as examples. Based on the current operational state, process 400 identifies 420 one or more issues (e.g., problem areas and/or improvement opportunities). For instance, process 400 outputs a list of diagnosed issues (e.g., problem areas, objects to be repaired, etc.), user skill/tool gaps, and/or potential bottlenecks, as examples. As examples, process 400 uses PCA (Principal Component Analysis), K-Means clustering (an example of an unsupervised machine learning technique) and/or root cause analysis to perform the issue identification and repair process generation.

Based on the output, in one example, process 400 predicts 430 the impact of the issues to generate one or more predicted repair processes 440, 450. Each predicted repair process includes one or more actions (e.g., tasks, steps, other actions) to be performed by a user to perform a repair of an object. Thereafter, process 400 simulates 460, 470 the generated predicted repair processes 440, 450. Inputs to the simulation include, for instance, impact data, resources, skill level of the user, historical success rates and/or environmental factors, which are input to a simulation algorithm, such as a neural network, one or more support vector machines, etc. Example simulations include Monte Carlo simulations, discrete event simulations, etc. The simulations of the one or more generated predicted repair processes (e.g., predicted repair processes 1 and 2) are run and output is provided. The output includes, for instance, results of the simulation (e.g., success of the prediction of the repair), any difficulties, time for the repair, cost, warranty concerns, manufacturer concerns, user evaluations, etc.

Figure 5:
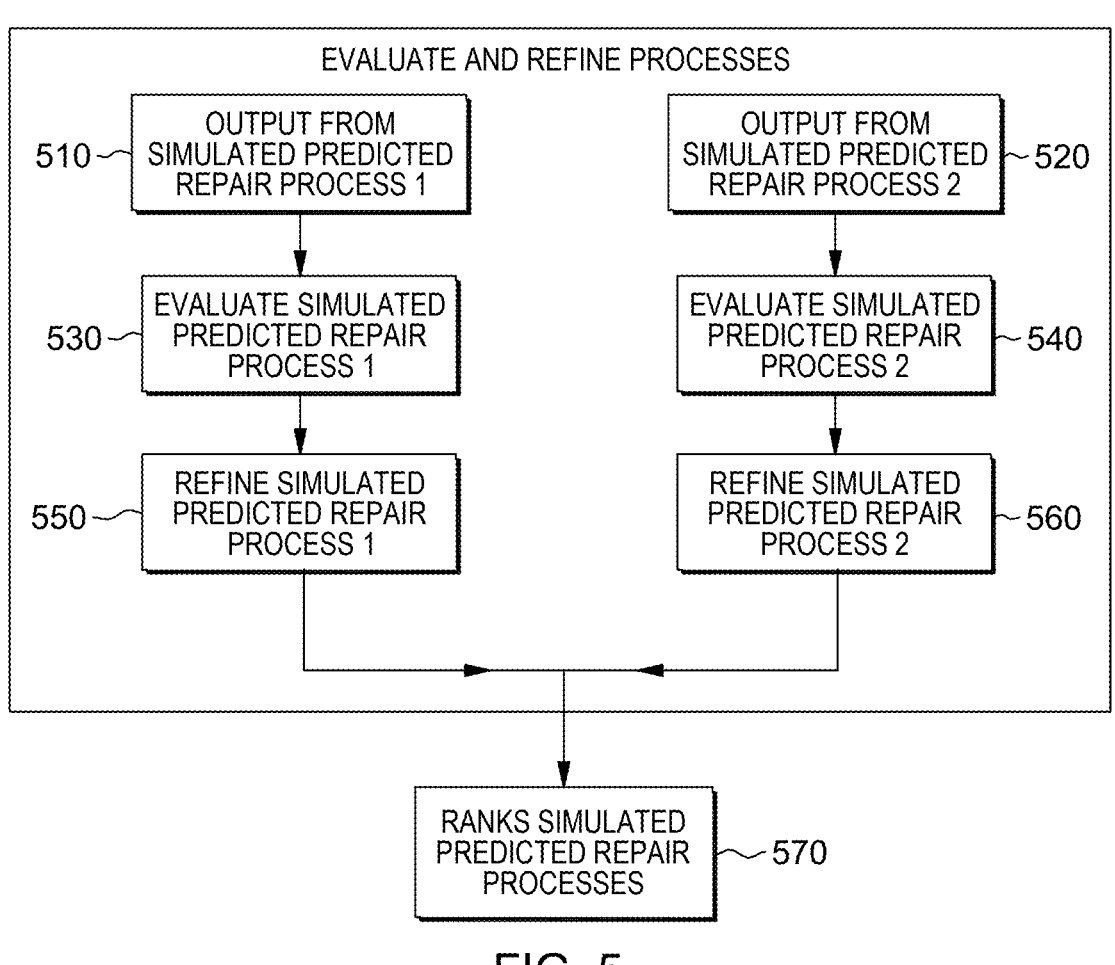
FIG. 5 depicts one example of a process to evaluate and refine generated predicted repair processes, in accordance with one or more aspects of the present disclosure.

Based on the simulations of the generated predicted repair processes, one predicted repair process is chosen to be used by the user to perform a repair. Further details regarding choosing a repair process are described with reference to FIG. 5. FIG. 5 depicts one example of a repair selection process 500 (also referred to as process 500). Process 500 is, in one example, part of and/or used by the intelligent workflow (e.g., workflow 300) to perform repair skills augmentation processing. Process 500 may be a workflow itself or processing executed by a workflow (e.g., workflow 300). In one example, process 500 is executed by one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute the process and/or portions thereof. Various options are possible.

Referring to FIG. 5, in one example, simulated predicted repair processes are evaluated, and an optimal repair process is selected. In one example, repair selection process 500 obtains 510, 520 output from simulating the generated predicted repair processes. The output includes, for instance, simulation results, performance metrics, repair time, risks, and/or cost estimates, etc. The output may include warranty considerations, manufacturer considerations, user evaluations, etc. The output may include additional, fewer and/or other outputs than described herein.

Process 500 evaluates 530, 540 the output of the simulation(s) to determine an optimal generated predicted repair process. Inputs to the evaluation include, for instance, simulation results, KPIs (key performance indicators), ROI (return on investment), downtime reduction, compliance thresholds, user skill/tool effectiveness, etc. These inputs may be used with decision trees, random forests, etc. to perform evaluations. Additional, fewer and/or other evaluation inputs and/or evaluation techniques may be used.

Process 500 determines, based on the evaluations, whether a simulated generated predicted repair process (e.g., simulated repair process 460, 470) is to be refined. If so, process 500 refines 550, 560 a simulated repair process. Output of the refinement includes, for instance, a refined predicted process with adjusted parameters (e.g., adjusted thresholds, skill reallocation, tool enhancements, etc.). Optimization may be performed using gradient descent, genetic algorithms, etc.

Based on the evaluations and/or optimization, process 500 ranks 570 the predicted repair processes in order to select an optimal predicted repair process. A predicted repair process is deemed optimal based on a selection criteria (e.g., highest success rate of the simulated repair processes based on predetermined criteria, ranking score based on predefined criteria, selection by the user (e.g., automatically, manually, etc.)). Based on the ranking, a simulated predicted repair process is selected as the repair process to be implemented and executed to repair the object.

Further details regarding implementing a repair process and performing continuous improvement of the intelligent workflow are described with reference to FIG. 6. As an example, the selection of the optimal predicted repair process, the development and implementation of a repair process based thereon and an on-going feedback loop are described to improve the model's future performance. In one example, an implementation and improvement process 600 (also referred to herein as process 600) is part of and/or used by the intelligent workflow (e.g., workflow 300). Process 600 may be a workflow itself or processing executed by a workflow (e.g., workflow 300). In one example, process 600 is executed by one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110; and/or other computing devices, etc.). Additional and/or other computing devices, computers, servers, processors, nodes and/or processing circuitry may be used to execute the process and/or portions thereof. Various options are possible.

Figure 6:
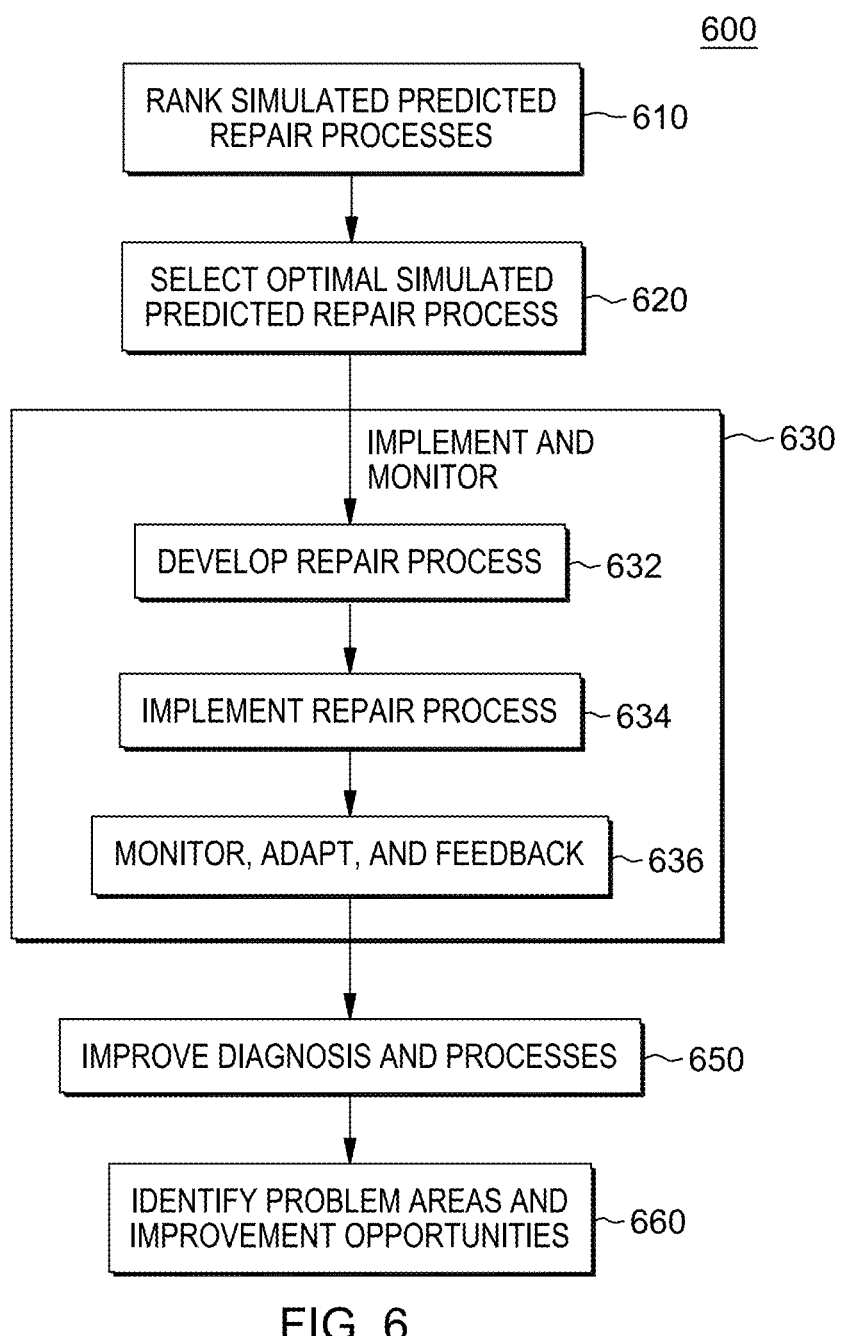
FIG. 6 depicts one example of a process to implement a repair process and to improve the intelligent workflow, in accordance with one or more aspects of the present disclosure.

Referring to FIG. 6, in one example, process 600 ranks 610 the simulated predicted repair processes, as described herein. Input to the ranking includes, for instance, a list of simulated predicted repair processes, evaluation criteria, repair effectiveness, resource constraints, etc. Algorithms that may be used include, for example, logistic regression for ranking, multi-criteria decision analysis, etc. Additional, fewer and/or other ranking inputs and/or ranking techniques may be used.

Based on the ranking, process 600 selects 620 an optimal predicted repair process. The output of the selection includes a repair process selection based on, e.g., logistic regression scoring and/or MCDA (multiple-criteria decision analysis) ranking. Other examples are possible, as described herein.

Process 600 performs 630 implementation and monitoring. In one example, process 600 develops 632 a repair process by, for instance, indicating that the selected predicted repair process is the repair process (and making any desired changes); or inputting optimal predicted repair process details, available resources, user skill requirements and/or tool availability to an algorithm, such as a linear programing for scheduling algorithm, cost benefit algorithm, etc., to create the repair process from the predicted repair process.

Process 600 implements 634 the developed repair process using, for instance, heuristic-based execution monitoring, real-time analytics, etc. providing an output, such as an executed repair process, operational adjustments, real-time monitoring setups, etc. The executed repair process includes, for instance, instructions (e.g., automatically and/or dynamically generated by the intelligent workflow using artificial intelligence) to be used by a user to repair an object. The instructions are commensurate with the user's skill level, in one example.

Process 600 monitors 636 the implemented repair process, adapts to any desired changes and provides feedback. As examples, the monitoring uses cameras, videos, user feedback, etc. to determine whether the instructions generated by the repair process (and therefore the repair process itself) are to be revised. For instance, process 600 determines that a resource (e.g., a tool or part) is inaccessible (e.g., unavailable, unusable, etc.) by the user, therefore, process 600 automatically and dynamically suggests one or more different resources and revises the instructions based thereon. Many examples are possible.

In one example, process 600 improves 650 diagnosis and/or repair processes using, for instance, Bayesian inference for adaptation, reinforcement learning, etc. Input to the improvement algorithm includes, for instance, real-time data, feedback loops, user skill/tool performance feedback, repair outcomes, etc. Output of the improvement algorithm includes enhanced diagnosis models, improved repair processes, updated skills/tools recommendations, etc. Process 600 may repeat refine scenarios based on feedback. For instance, it may continually learn, retrain the artificial intelligence models and adapt.

As an output of the diagnosis improvement, process 600 may identify 660 problem areas and/or improvement opportunities. Many examples are possible.

Although various capabilities of an intelligent workflow are described herein. In other embodiments, an intelligent workflow may include additional, fewer and/or other capabilities. The capabilities/aspects described herein are just examples.

Described above is one example of an intelligent workflow. One or more aspects of the intelligent workflow and/or repair process generated therefrom may use machine learning. For instance, machine learning may be used to train the workflow and/or repair process(es), perform predictive modeling, perform optimization modeling, determine constraints/restrictions, learn from previous data/events, and/or perform other tasks. A system is trained to perform analyses and learn from input data and/or choices made.

Figure 7:
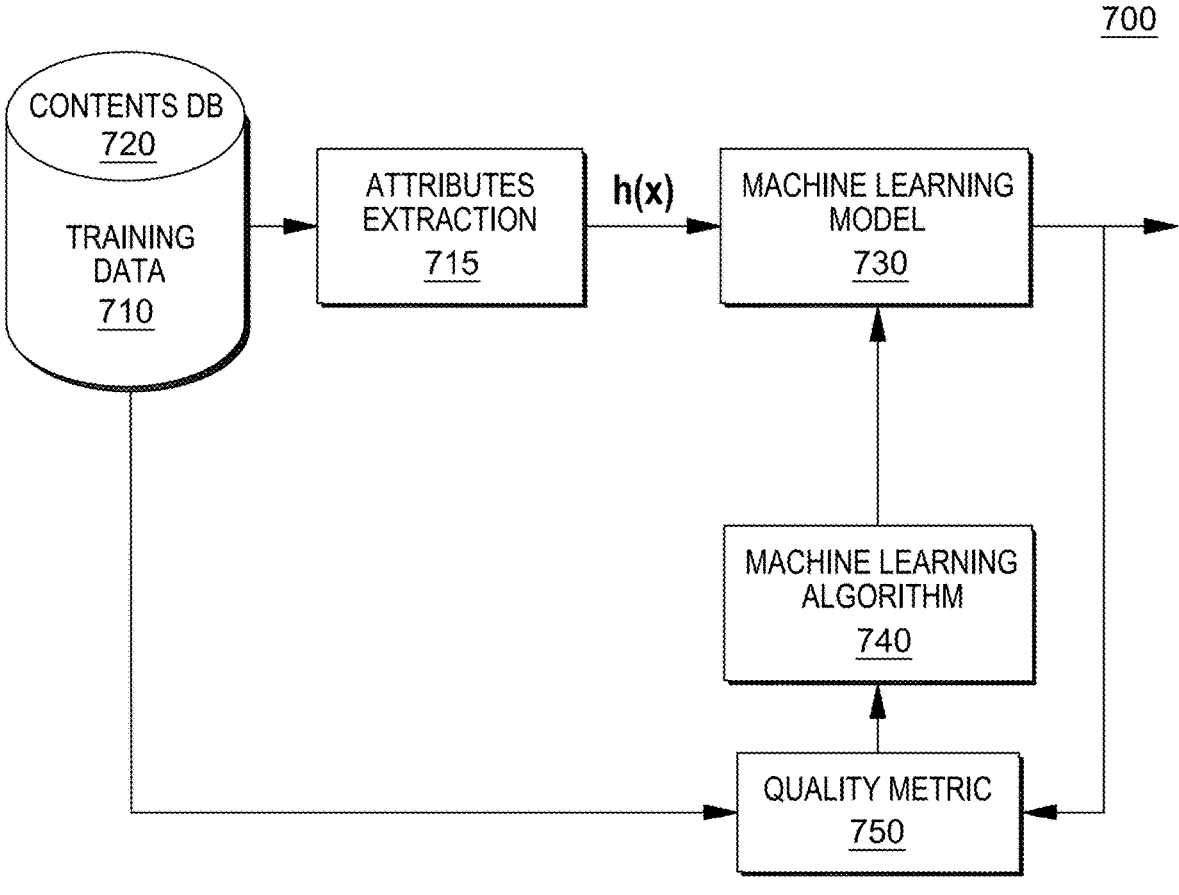
FIG. 7 depicts one example of a machine learning training system used in accordance with one or more aspects of the present disclosure.

One example of a machine learning training system is described with reference to FIG. 7. In one or more aspects, a machine learning training system 700 may be utilized to perform cognitive analyses of various inputs, including input data, data from one or more sources, repositories, data structures and/or other data. The data may include object information for an object to be repaired (e.g., product specifications, descriptions, other information), skill information to repair the object, resource information, etc. Training data utilized to train the model in one or more embodiments of the present disclosure includes, for instance, data that pertains to one or more events, such as natural language processing data, record data being processed; data that pertains to objects to be repaired; data relating to devices, including monitors, sensors, environmental devices, etc.; data obtained from the devices; data obtained from exogenous sources (e.g., object information, skill information, resource information); actions that have been taken; and/or available resources; etc. The program code in embodiments of the present disclosure performs a cognitive analysis to generate one or more training data structures, including algorithms utilized by the program code to predict states of a given event (e.g., repair of an object, etc.). Machine learning (ML) solves problems that are not solved with numerical means alone. In this ML-based example, program code extracts various attributes from ML training data 710 (e.g., historical attribute data collected from various data sources relevant to the event (e.g., repair)), which may be resident in one or more databases 720 comprising event or task-related data and general data. Attributes 715 are utilized to develop a predictor function, h(x), also referred to as a hypothesis, which the program code utilizes as a machine learning model 730.

In identifying various event states, features, attribute similarities, constraints and/or behaviors indicative of states in the ML training data 710, the program code can utilize various techniques to identify attributes in an embodiment of the present disclosure. Embodiments of the present disclosure utilize varying techniques to select attributes (data attributes, elements, patterns, features, constraints, distribution, etc.), including but not limited to, diffusion mapping, principal component analysis, recursive feature elimination (a brute force approach to selecting attributes), and/or a Random Forest, to select the attributes related to various events. The program code may utilize a machine learning algorithm 740 to train the machine learning model 730 (e.g., the algorithms utilized by the program code), including providing weights for the conclusions, so that the program code can train the predictor functions that comprise the machine learning model 730. The conclusions may be evaluated by a quality metric 750. By selecting a diverse set of ML training data 710, the program code trains the machine learning model 730 to identify and weight various attributes (e.g., data attributes, features, patterns, constraints, distributions, etc.) that correlate to various states of an event.

The model generated by the program code is self-learning as the program code updates the model based on active event feedback, as well as from the feedback received from data related to the event. For example, when the program code determines that there is a constraint, event, similarity or pattern (e.g., data attribute, record attribute similarity, query pattern, data distribution, search terms distribution, etc.) that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are biologically-inspired programming paradigms, which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (or similarities) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

As described herein, an intelligent workflow is provided that uses artificial intelligence (e.g., machine learning, large language models, etc.) to perform augmented repair skills processing.

In one or more aspects, repair scenarios (e.g., predicted repair processes) are dynamically generated using an artificial intelligence driven chain of reasoning, in which generative artificial intelligence models create real-time processes based on the user's skill level (e.g., experience level, available skills, etc.) and contextual data. Each step of the repair process, in one example, is verified and certified via an artificial intelligence chain of reasoning that evaluates scenario execution against predefined standards with adherence recorded on a blockchain for immutable documentation. A repair process is continuously refined by simulating and evaluating the process using an artificial intelligence driven chain of reasoning, optimizing scenario outcomes based on real-time feedback and captured learnings, which are then used to enhance future process generation. The artificial chain of reasoning includes, for instance, iterative steps of generating, simulating, evaluating, refining and ranking repair processes, ensuring that only the most effective and compliant processes are implemented. The learning cycle of artificial intelligence driven repair processes are accelerated, in which blockchain technology securely records the verification and certification of each process execution, feeding back learnings into the generative artificial intelligence to continuously improve accuracy and effectiveness. A continuous feedback loop and reinforcement learning are incorporated, in which real-time performance data and process outcomes are used to train the generative artificial intelligence, enhancing its ability to create increasingly effective and adaptive repair processes over time. The artificial intelligence chain of reasoning dynamically adjusts repair strategies in real-time based on deviations during execution, ensuring compliance and optimal outcomes, with all (or selected) steps and adjustments recorded on the blockchain for future analysis.

In one or more aspects, generative artificial intelligence and chain of reasoning are used to facilitate infusing or augmenting users that are unskilled or lacking skills with the skills they lack. One or more aspects facilitate the providing of an appropriate proposed resolution, validated against the corpus leveraging recursive feedback, an improved version of quality feedback.

In one or more aspects, generative artificial intelligence creates instructions for the user to follow, including text, audio, photographs, images and/or video, complying with the language, available resources, existing skills, etc. of the user.

In one or more aspects, discovery and application are provided for making end-users/consumers self-sufficient in their support. Warranty certification is provided indicating that the repair has been performed properly, by whom, and when, and written to an immutable record, therefore, increasing the value of the repaired asset and increasing customer satisfaction.

Performing warranty self-service is a savings for manufacturers and increases customer satisfaction. Self-service enables individuals and businesses to avoid the expense of in-person experts traveling to the location to perform a repair. The right to repair is enabling individuals and businesses to avoid the expense of in-person experts traveling to the location to perform a repair. Rapid changes in technology are coming at such a speed that it is very difficult to gain the new skills fast enough. Performing warranty self-service is a savings for manufacturers and increases customer satisfaction. Warranty claims are reduced via sanctioned self-service. There are savings in travel, personnel costs and/or warranty claims by providing just-in-time training to users, which provides higher quality work, yielding increased revenues and reduced labor costs.

In one or more aspects, sanctioned self-service provides reduced insurance claims, reduced fraud and mitigates damages. Business may grow by not having to pay out claims.

In one or more aspects, unskilled (or less skilled) users are enabled to be immediately and near-instantaneously infused or augmented with the skills they lack with no learning curve (not so much about learning as just getting it done). Personalized content is based on the user's skill set.

In one or more aspects, dexterity and abilities of the user are compensated for, including, but not limited to, a lack of tools or ability by using artificial intelligence to improvise a workaround on the spot. If the task is beyond the user's capability, one or ore other options are provided for resolution.

In one or more aspects, the repair is certified that it has been performed correctly and the certification and/or a description of the repair is registered in a blockchain. As examples, a visual of the results and/or the repair process is registered in the blockchain.

Continuous feedback and improvement are performed. The experiences are used to improve the large language model so that the next repair/action is improved based on experience. Recommended training is provided so the next iteration is improved and/or faster. Individuals are recruited, in one or more examples, to perform similar tasks for others. Experiences gained are placed in a skills marketplace to help others/businesses grow.

In one or more aspects, a repair request (also referred to as an inquiry) is received (e.g., from a user, requester, etc.), and the repair request includes product information (e.g., of an object to be repaired by the user) and data. In one embodiment, the repair request is divided into a plurality of portions (e.g., steps, actions, tasks), and a determination is made, based on the user's skill set (e.g., skill level, experience, etc.) and using, e.g., a large language model (and/or other artificial intelligence), of which of the plurality of portions the user is capable of performing. Instructions for each of the plurality of portions the user is capable of performing are generated. The instructions include, for instance, an augmented reality instructional guide. For each of the plurality of portions the user is incapable of performing, one or more assist resources are identified. Performance of the user repairing the object is monitored using, e.g., video feedback. The repair performance is utilized in retraining the large language model.

As examples, the large language model is specifically trained, based on capabilities of the user, to provide recommended instructions for the user. A determination of the user's capabilities (e.g., skill set) uses one or more of a list of skills, biometric data from one or more devices explicitly authorized by the user, a record of previous tasks performed by the user, etc.

As examples, results of the repair performance are included in a blockchain ledger; warranty reimbursement based on the repair performance is applied for; and/or an online shopping list of one or more resources to be used to complete the repair is created.

One or more aspects are tied to computer technology and facilitate processing within a computer, improving performance thereof. In one or more aspects, technical fields of computing and artificial intelligence are improved. For instance, the generation and/or execution of intelligent workflows and repair processes is facilitated and/or improved. Processing is facilitated by dynamically changing the workflow and/or repair processes. This saves on memory/storage requirements by not requiring storing of each possible process.

In one or more aspects, a tailored instruction intelligent workflow (including, but not limited to, video, text, segmented reality) is generated to accomplish a task. The task includes, but is not limited to, repairing an object using available parts on hand. As a particular example, in one or more aspects, the immediate environment is scanned to inventory available resources (e.g., tools and materials) that could be used in the repair. For example, a cell phone camera is used to discover that duct tape, a hammer and candy are readily available.

In one or more aspects, the appropriate mechanism to be used to perform the repair is determined. For example, to repair a hole in a bucket, the duct tape (as opposed to the hammer and candy) may be the best resource to use to close the hole.

In one or more aspects, the large language model is leveraged to provide expert knowledge to determine constraints. For example, a camera, product documentation, past repair/enhancement history and available inventory are used to recognize constraints and optimize based on those constraints. For example, substitutions may be provided for the recommended/optimal part to complete a repair.

One example of pseudocode used by an intelligent workflow to perform augmented repair skills processing includes:

```
asIsOperationalState=inputCurrentState( )
improvementOpportunities=identifyImprovementOpportunitys
scenarios=[ ]
for each opportunity in improvementOpportunities:
    impact=predictImpactWithAI(opportunity, asIsOpera-
        tionalState)
    toBeScenarios=generateToBeSecenarios(impact)
    For scenario in toBeScenarios:
        simulateScenario(scenario)
        reward=evaluateSecnerio(scenario)
        refineScenario(scenario, reward)
    Scenarios.append(toBeScenarios)
rankedScenarios=rankScenarios(scenarios)
optimalSecneario=selectOptimalScenario(rankedSce-
    nario)
implementPlan(repairPlan)
monitorAndAdapt(repairPlan)
``` where scenario is, e.g., a predicted repair process.

Other aspects, variations and/or embodiments are possible.

The computing environments described herein are only examples of computing environments that can be used. One or more aspects of the present invention may be used with many types of environments. Each computing environment is capable of being configured to include and/or use one or more aspects of the present disclosure. For instance, each may be configured to provide and/or use intelligent workflow and/or to perform one or more other aspects of the present disclosure.

In addition to the above, one or more aspects may be provided, offered, deployed, managed, serviced, etc. by a service manager who offers management of customer environments. For instance, the service manager can create, maintain, support, etc. computer code and/or a computer infrastructure that performs one or more aspects for one or more customers. In return, the service manager may receive payment from the customer under a subscription and/or fee agreement, as examples. Additionally, or alternatively, the service manager may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other objects, considerations and/or devices may be used, other conditions may be considered and/or other recommendations may be provided. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

receiving, via at least one network, a request to repair an object;

executing, on at least one computing device based on obtaining the request via the at least one network, an intelligent workflow to generate instructions to be used by a user to repair the object, the intelligent workflow executing at least one artificial intelligence model trained to generate the instructions based on a skill level of the user as related to repairing the object, wherein the executing the intelligent workflow to generate the instructions includes monitoring, in real-time, performance of the repair;

automatically generating, using the intelligent workflow being executed and based on determining that a resource to be used by the user to repair the object is inaccessible to the user, an indication of one or more alternative resources to be used by the user to repair the object;

recording in a blockchain a record of the repair, and retraining the at least one artificial intelligence model executed by the intelligent workflow in which an improved artificial intelligence model is generated, the retraining using information learned from a feedback loop executed to learn information relating to the instructions used to repair the object, and wherein the intelligent workflow executes the improved artificial intelligence model to generate other instructions to repair the object another time.

2. The computer-implemented method of claim 1, wherein the recording in the blockchain includes recording in the blockchain at least one repair description selected from a group of repair descriptions consisting of: a video of the repair, text describing the repair, images of the repair and an audio description of the repair.

3. The computer-implemented method of claim 1, further comprising certifying the repair using the record in the blockchain, the certifying providing a certification to be used in warranty protection.

4. The computer-implemented method of claim 1, further comprising dynamically revising the instructions based on the monitoring.

5. The computer-implemented method of claim 1, wherein based on the monitoring indicating that the resource is inaccessible, the generating the instructions includes generating the instructions to include the one or more alternative resources.

6. The computer-implemented method of claim 1, wherein based on the monitoring indicating that the user is unable to perform the repair, dynamically determining, using the intelligent workflow, one or more assist resources to assist in performing the repair.

7. The computer-implemented method of claim 1, wherein the retraining includes retraining the at least one artificial intelligence model based on the monitoring the performance of the repair.

8. The computer-implemented method of claim 1, wherein based on executing the intelligent workflow to generate the instructions to be used to repair the object, automatically creating an online shopping list of one or more resources to be used in the repair.

9. The computer-implemented method of claim 1, wherein the resource is a tool to be used to repair the object.

10. The computer-implemented method of claim 1, wherein the resource is a part to be used to repair the object.

11. A computer program product comprising:

a set of one or more computer-readable storage media; and program instructions, collectively stored in the set of one or more computer-readable storage media, for causing at least one computing device to perform computer operations including:

receiving, via at least one network, a request to repair an object;

executing, on the at least one computing device based on obtaining the request via the at least one network, an intelligent workflow to generate instructions to be used by a user to repair the object, the intelligent workflow executing at least one artificial intelligence model trained to generate the instructions based on a skill level of the user as related to repairing the object, wherein the executing the intelligent workflow to generate the instructions includes monitoring, in real-time, performance of the repair;

automatically generating, using the intelligent workflow being executed and based on determining that a resource to be used by the user to repair the object is inaccessible to the user, an indication of one or more alternative resources to be used by the user to repair the object; and recording in a blockchain a record of the repair; and retraining the at least one artificial intelligence model executed by the intelligent workflow in which an improved artificial intelligence model is generated, the retraining using information learned from a feedback loop executed to learn information relating to the instructions used to repair the object, and wherein the intelligent workflow executes the improved artificial intelligence model to generate other instructions to repair the object another time.

12. The computer program product of claim 11, wherein the computer operations further comprise certifying the repair using the record in the blockchain, the certifying providing a certification to be used in warranty protection.

13. The computer program product of claim 11, wherein the computer operations further comprise dynamically revising the instructions based on the monitoring.

14. The computer program product of claim 11, wherein based on the monitoring indicating that the user is unable to perform the repair, dynamically determining, using the intelligent workflow, one or more assist resources to assist in performing the repair.

15. The computer program product of claim 11, wherein based on executing the intelligent workflow to generate the instructions to be used to repair the object, automatically creating an online shopping list of one or more resources to be used in the repair.

16. The computer program product of claim 11, wherein based on the monitoring indicating that the resource is inaccessible, the generating the instructions includes generating the instructions to include the one or more alternative resources.

17. A computer system comprising:

at least one computing device;

a set of one or more computer-readable storage media; and program instructions, collectively stored in the set of one or more computer-readable storage media, for causing the at least one computing device to perform computer operations including:

receiving, via at least one network, a request to repair an object;

executing, on the at least one computing device based on obtaining the request via the at least one network, an intelligent workflow to generate instructions to be used by a user to repair the object, the intelligent workflow executing at least one artificial intelligence model trained to generate the instructions based on a skill level of the user as related to repairing the object, wherein the executing the intelligent workflow to generate the instructions includes monitoring, in real-time, performance of the repair;

automatically generating, using the intelligent workflow being executed and based on determining that a resource to be used by the user to repair the object is inaccessible to the user, an indication of one or more alternative resources to be used by the user to repair the object; and recording in a blockchain a record of the repair; and retraining the at least one artificial intelligence model executed by the intelligent workflow in which an improved artificial intelligence model is generated, the retraining using information learned from a feedback loop executed to learn information relating to the instructions used to repair the object, and wherein the intelligent workflow executes the improved artificial intelligence model to generate other instructions to repair the object another time.

18. The computer system of claim 17, wherein the computer operations further comprise certifying the repair using the record in the blockchain, the certifying providing a certification to be used in warranty protection.

19. The computer system of claim 17, wherein the computer operations further comprise dynamically revising the instructions based on the monitoring.

20. The computer system of claim 17, wherein based on the monitoring indicating that the user is unable to perform the repair, dynamically determining, using the intelligent workflow, one or more assist resources to assist in performing the repair.

* * * * *